March 13, 1934.                P. S. EDWARDS ET AL                1,951,276
                          TEMPERATURE MEASURING DEVICE
                   Filed July 12, 1929          2 Sheets-Sheet 2
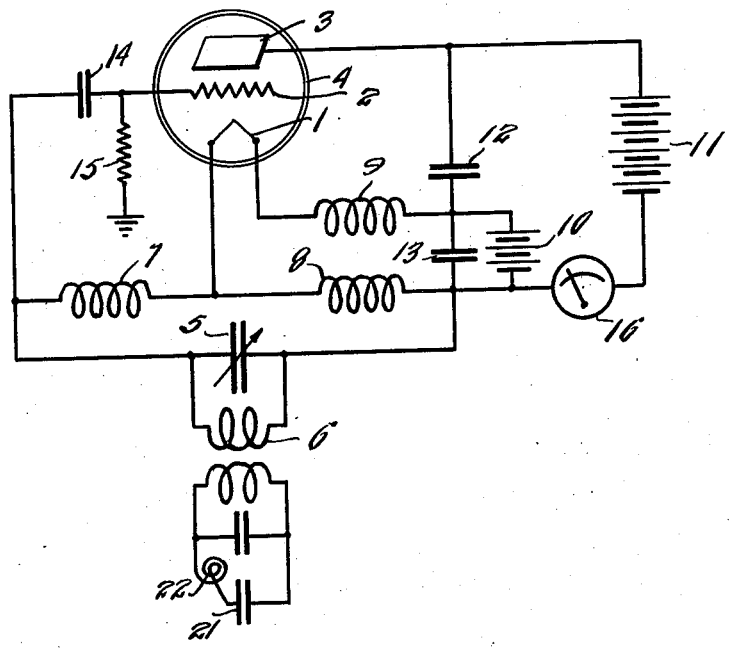
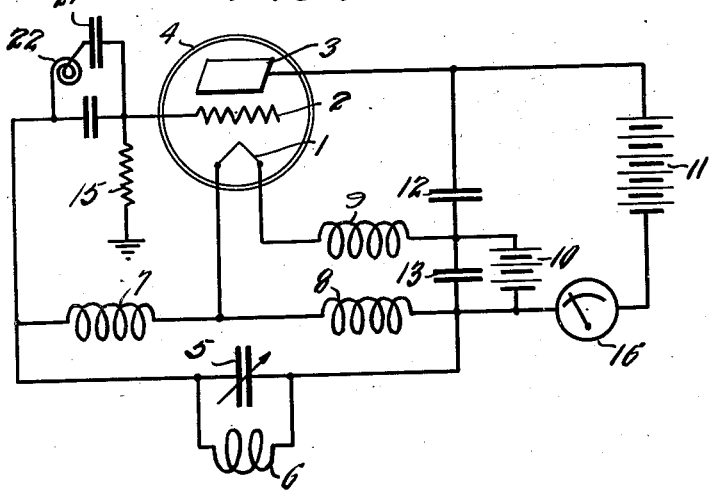
Inventors
PAUL S EDWARDS
AND C. D. BARBULESCO
By Semmes & Semmes
Attorneys Patented Mar. 13, 1934

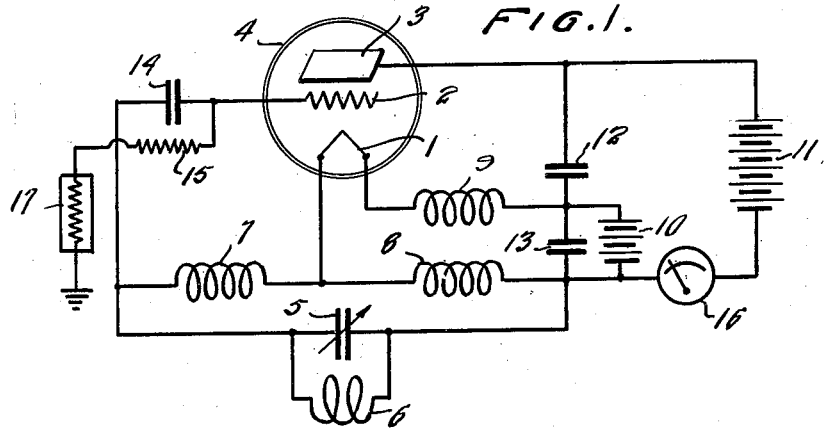
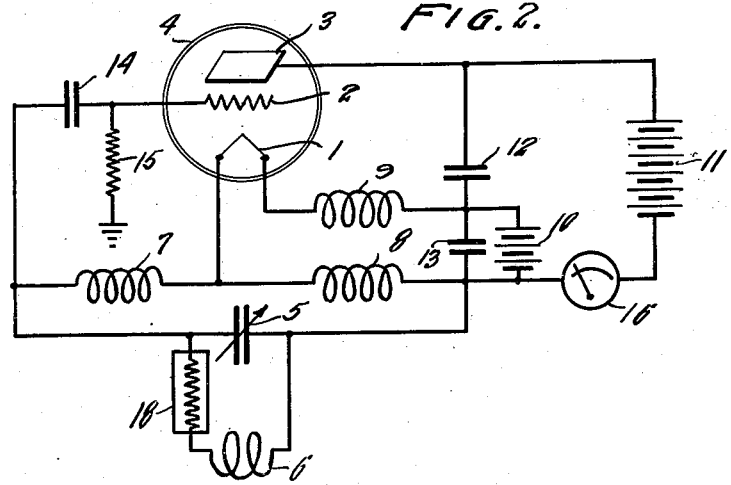
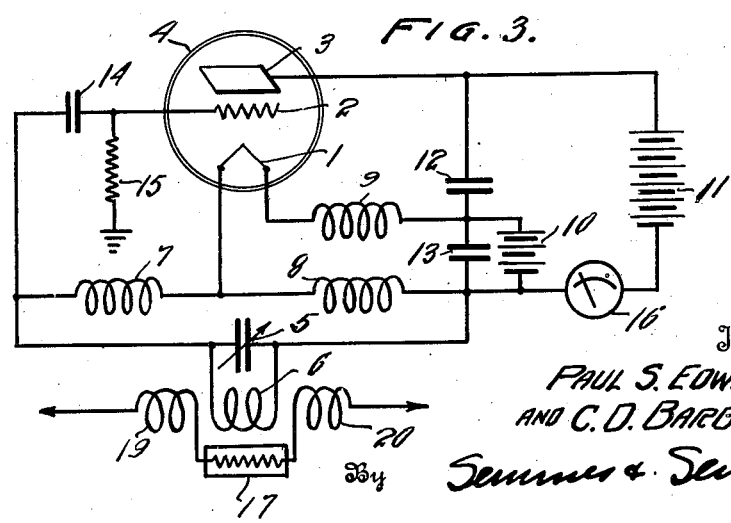

1,951,276

UNITED STATES PATENT OFFICE 1,951,276

TEMPERATURE-MEASURING DEVICE

Paul S. Edwards and Constantin D. Barbulesco, Dayton, Ohio

Application July 12, 1929, Serial No. 377,908

6 Claims. (Cl. 73—32)

This invention relates to electrical instruments and more particularly to an improved thermo-electrical temperature measuring device.

This invention is a continuation in part of applications Serial Nos. 305,753, Patent No. 1,874,222 and 305,754, Patent No. 1,905,332, filed September 13, 1928.

A major object of the present invention is to devise a heat measuring system of very great sensitivity and faithful response and which is adapted to indicate small variations of thermal changes. These thermal variations may be detected, indicated or recorder at a near-by or remote point.

In order to clearly explain the underlying principles of the invention, preferred modifications of it are shown in the accompanying drawings, in which:

Figure 1 represents thermo-responsive means associated with the grid circuit of an improved self-modulated vacuum tube oscillator.

Figure 2 is a modification of Figure 1 in which the thermo-responsive device is associated with the tank circuit.

Figure 3 is an illustration of an apparatus in which the thermo-responsive element is associated with an external circuit.

Figures 4 and 5 are modifications respectively of Figures 3 and 1.

Similar parts will be designated throughout the several Figures by the same reference numerals.

According to the present invention, a very accurate and sensitive thermal indicating means is provided by associating a thermo-responsive element with certain elements of an ultra-sensitive thermionic indicator. In accordance with the present invention, the thermo-responsive element may be associated either with the grid leak, grid condenser, or inductively coupled to a tank circuit.

As shown in Figure 1, the instrument incorporating the principles of this invention comprises a vacuum tube including a filament 1, grid 2 and plate 3. These are enclosed within a highly evacuated container 4 to form a hard tube. Connected to the input and output electrodes of the tube is a low loss tank circuit. This comprises the large variable capacity 5 and small inductance 6. This tank circuit, as will be disclosed hereinafter, largely controls the frequency at which the generator oscillates.

Conductively connected to the filament 1 are the high frequency choke coils 7 and 8. These comprise a relatively large number of turns of wire and, as shown, are connected in the grid and plate circuits respectively of the tube. These two choke coils function to produce two driving electromotive forces which are substantially 180° out of phase and by their geometric sum produce a composite heavy oscillating current in the tank circuit 5—6.

The power supply of the tube includes the filament battery 10 and plate battery 11. These are maintained, as shown, at current potential. The choke coil 9 connected to the filament is similar to the coils 7 and 8 and serves to maintain the filament at a high potential with respect to the current.

Numerals 12 and 13 indicate bypass condensers of large value to permit passage of high frequency currents in the plate circuit. As noted above, the frequency of the oscillations in the tube is controlled largely by the value of the elements in the tank circuit, namely the large condenser 5 and small inductance 6. Inasmuch as this condenser is of very large value, the interelectrode capacity of the tube becomes relatively negligible in effect. Hence, replacements of the tube or minor variations in the characteristics of a given tube during normal use will not appreciably affect the frequency period of the oscillations in the tank circuit.

The present oscillation generator is designed to be self-modulating. As shown, the grid circuit is provided with a blocking condenser 14 and a resistance leak 15. The value of the condenser and leak is so chosen that the high frequency oscillations, maintained in the tank circuit, will periodically charge the condenser up to a certain value and then discharge through the leak to the ground. Hence, the blocking condenser and leak resistance, together with any other associated capacitances or resistances, will produce a periodic interruption or chopping of the high frequency oscillations. The period of this parasitic discharge is controlled by the time constant CR which, as will be understood, may vary, depending upon the values chosen, from a few cycles per second up to several thousand or more. The frequency of this period charge and discharge is governed, as stated, by the values of the capacity and resistant elements interposed. For a given large value of the grid leak, the parasitic frequency is low and the grid of the tube becomes strongly biased. The resultant plate current consequently is quite small and is maintained at this low value until some internal or external cause is made to effect the circuit.

Conversely, a decrease in the value of the grid resistance will tend to increase the frequency of the periodic discharge and will cause a resulting increase in the plate current due to the fact that the amplitude of the high frequency oscillations cannot reach high values. Likewise, a decrease in the value of the blocking condenser will have the same effect.

It will be observed that if the condenser 14 or the resistance 15 is replaced by an element whose capacity or resistance, respectively, varies under thermal changes, a graduated variation in the grid bias and a concomitant change in the plate current may be obtained. It will likewise be appreciated that for a given element, a meter 16 indicating the current flow in the plate circuit may be calibrated directly in terms of temperature changes; that is to say, in degrees.

For this reason it is to be observed that we do not intend to be limited to any specific thermo-responsive device, and that such as are described hereinafter are to be taken merely as typical examples of any elements whose physical characteristics change under the influence of varying caloric conditions.

In Figure 1 is shown one example of an arrangement in which a thermo-sensitive element which undergoes a change in electrical characteristics upon application of heat, is associated with the circuit. This element, for example, may comprise a material whose electrical resistivity is varied upon thermal changes. As a specific example, this device, indicated generally by the numeral 17, may consist of a button of compressed lamp black which is connected, as shown, by metallic conductors to the ground and to the resistance 15. This button may be maintained under pressure by a metallic member whose length varies with heat, such for example as a strip of metal or alloy having a high coefficient of heat expansion, as an aluminous alloy.

This type of measuring instrument is well known and is used in the micro-tasiometer.

Upon the application of heat, the metallic member will expand and compress the button of lamp black and therefore vary the electrical resistance of the latter. This variation in the grid resistance, as explained above, will effect a variation in the modification or chopping effect, with a resulting change in the plate current. If desired, this type of resistance varying element may be employed either in the tank circuit itself, as shown at 18, or in an external circuit 19—20 inductively coupled to the tank circuit.

When the thermo-responsive element is connected in the external circuit, the two circuits 19—20 and 5—6 are tuned for normal temperature conditions. Upon an increase in temperature adjacent the external circuit and a variation in the electrical characteristics of the element 17 positioned therein, losses will be set up in the tank circuit 5—6 and its reactance will be changed. This will cause a variation in the plate current, which variation may be read off on the calibrated instrument 16.

It will be noted at this point that a striking characteristic of the tank circuit is that changes in its reactance are followed by corresponding variations in the plate current as explained in full in the copending application Serial No. 305,754.

Similarly, as shown in Figure 2, the thermo-responsive element may be inserted directly in the tank circuit 5—6. When this element is subject to heat, the electrical characteristics of the tank circuit will correspondingly vary and cause a change in the frequency of oscillations therein.

This variation in the characteristics of the tank circuit results in a commensurate change of variation in the plate current indicated in meter 16.

It will be appreciated that a number of different types of thermo-responsive elements may be employed in any or all of the positions above described. An example of different particular thermo-responsive units is shown in Figures 4 and 5, in which a bi-metallic thermal element 21 is placed in the tuned external circuit and in the grid circuit respectively. This element, for example, may comprise, in effect, a condenser which when subjected to heat varies its capacity. As an example, the condenser may be made up of two metallic plates, one of which has a substantially negligible degree of thermal expansion and the other a high degree of thermal expansion, so that on the application of heat the effective armature area of the element is varied with a corresponding variation in capacity. Also, if desired, the condenser may comprise two substantially similar plates, one of which is fixed and the other of which is connected to a metallic member 22 which expands considerably upon a raise in temperature.

These elements are so positioned that upon the application of heat the condenser plate, which is connected to the element 22, will vary its distance with respect to the other, thereby changing the dielectric gap and correspondingly modifying the capacity of the condenser. In each case a variation in the capacity of the condenser, caused by the application of heat, may be read off in the meter 16 positioned in the plate circuit.

While there are shown and described several embodiments of the invention, it is to be understood that these are given primarily as examples of the range of the modification of which the invention is susceptible.

It will be appreciated that the invention itself resides broadly in the concept of the association of any thermo-responsive element which for its operation depends upon any physical change attendant upon the application of heat and which is associated directly or indirectly with a self-modulating high frequency oscillator.

It will be observed that the devices which have been described may by proper adjustments and choice of materials be used as pyrometers, fire alarm systems, meteorological instruments for recording temperatures, humidity and other physical changes.

We claim:

1. A temperature indicating device comprising a vacuum tube high frequency oscillator, means to modulate the high frequency at audible frequency, a temperature controlled resistance connected to said modulating means and an indicating device associated with the plate of the tube responsive to the variations of said resistance.

2. A thermal indicating device, a vacuum tube high frequency oscillator, means to modulate the high frequencies at audible frequencies comprising the blocking condenser and leak resistance connected in the grid circuit, an element whose resistance varies with temperature connected to the leak resistance, and an indicating device connected in the output circuit of the tube and responsive to the variations in plate current effected by said temperature controlled resistance.

3. A pyrometer comprising a vacuum tube high frequency oscillator, means to modulate the high frequency at audible frequency, a thermal responsive variable resistance connected to the modulating means and adapted to vary its modulating effect and means to measure the value of the variations comprising a meter calibrated in terms of temperature connected in the plate circuit of the oscillator.

4. A temperature measuring device comprising a high frequency vacuum tube oscillator, means to modulate the high frequency oscillations at audible frequency including a grid condenser and leak, a temperature controlled variable resistance connected in series to the grid leak and adapted upon a change in resistance to modify the modulating effect and means to measure the value of the variations comprising a meter connected in the output circuit of the tube, calibrated in thermal units.

5. A temperature measuring instrument comprising a vacuum tube high frequency oscillator, a tank circuit comprising a large capacitance and small inductance connected between grid and plate, means to modulate the generated high frequency oscillations at an audible rate comprising a grid condenser and leak, a thermal responsive variable resistance connected in series with the leak and adapted to further modulate the high frequency oscillations of the circuit and means connected in the plate circuit to indicate the modulation effected by said variable resistance.

6. A temperature indicating device comprising a vacuum tube high frequency oscillator, means to modulate the high frequency at audible frequency, a temperature controlled means associated with said modulating means for varying the characteristics thereof, and an indicating device associated with the plate of the tube responsive to the variations of said temperature controlled means.

PAUL S. EDWARDS.
CONSTANTIN D. BARBULESCO.